Aug. 19, 1924.
C. F. SIDERS
LIQUID DEPTH GAUGE
Filed Feb. 17, 1923
1,505,931
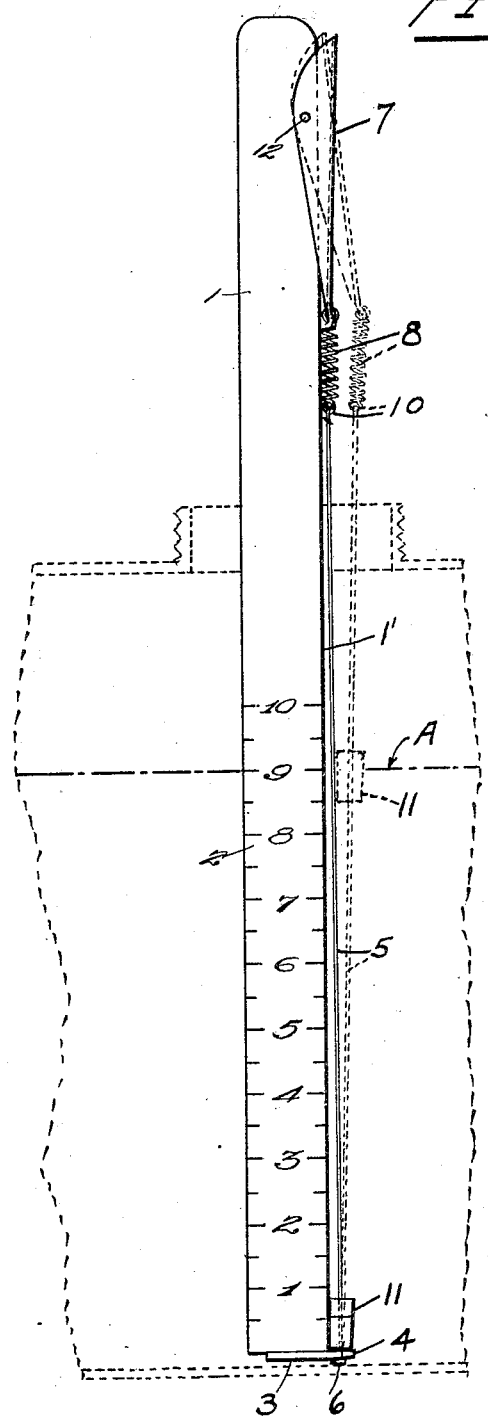
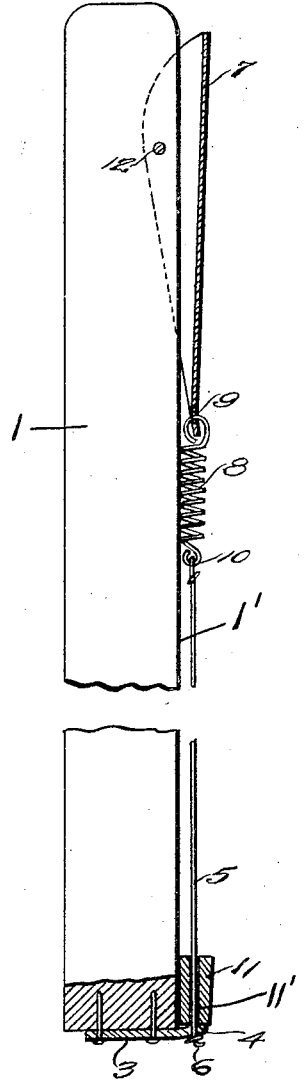
Inventor
Cecil F. Siders.
By
Attorney Patented Aug. 19, 1924.

1,505,931

UNITED STATES PATENT OFFICE.

CECIL F. SIDERS, OF NORWOOD, OHIO.

LIQUID-DEPTH GAUGE.

Application filed February 17, 1923. Serial No. 619,713.

*To all whom it may concern:*

Be it known that I, CECIL F. SIDERS, a citizen of the United States, residing at Norwood, in the county of Hamilton and State of Ohio, have invented certain new and useful Improvements in Liquid-Depth Gauges, of which the following is a specification.

This invention relates to improvements in liquid depth gauges and has for an object to provide a gauge of the ullage rod type which can be used for accurately determining the quantity of gasoline in an automobile tank.

A further object of the invention is to provide a portable gauge which can be carried in the tool box or under the front seat of an automobile when not being used.

A further object of the invention is to provide a gauge of the above indicated character, which is simple in construction, durable, efficient for the purpose intended, and one that can be manufactured and placed on the market for sale at a very low cost.

These and like objects of the invention will be better understood as the description follows and as is specifically pointed out in the appended claims.

Referring to the accompanying drawing which forms a part of this specification and which clearly illustrates the construction of my invention, Figure 1 is a side elevation of my improved gauge or measuring device showing the same applied to a gasoline tank as indicated by dotted lines, and Figure 2 is an enlarged view of the upper and lower portions of the device, the lower portion being partly in cross section.

Referring to the accompanying drawing in detail, like characters will be used to designate like parts in the different views.

In the drawing, the numeral 1 indicates the body of my gauge which is constructed in the shape of a ruler having the lower portion of same provided with markings 2 for indicating the number of gallons of gasoline within the tank of an automobile. Secured to the bottom or foot of the body 1 is a plate 3 which has one end projecting beyond the front edge of the body as at 4 and which is provided with an aperture therethrough. A wire 5 has one end secured to the plate 3 in any suitable manner as by inserting the end through a hole in the extension 4 and forming a knot 6 with said end. An operating lever 7 is pivotally connected intermediate its ends to the upper portion of the body 1 adjacent the front edge thereof. A coil spring 8 is connected between the lower end of the lever at 9 and an eye 10 formed in the upper end of wire 5 so that said wire is held taut parallel to but spaced from the front edge 1' of said body or ruler.

An elongated float 11 is provided with an axial bore 11' and is so mounted on the wire 5 as to be freely slidable thereon but in frictional contact with the front edge 1' of the ruler.

In operation the device is inserted through the usual filling opening of a tank until the plate 3 rests on the bottom of the tank. The lever 7, which is pivoted at 12 to the ruler 1 so that its ends have a limited lateral movement toward and away from the front edge 1' thereof, is manipulated by the hand so that the upper free end is pressed in against the edge 1', the lower end moving outward against the tension of spring 8 and carrying with it the spring and the upper portion of wire 5, as shown by dotted lines in Fig. 1. This movement of wire 5 releases the float 11 which rises to the surface A of the liquid. The lever 7 is then released and the spring 8 serves to return the lever, spring and wire to their normal positions whereby the float is held by wire 5 in frictional contact with the straight edge 1' of the ruler 1 adjacent that graduation on the scale designating the depth or quantity of liquid in the tank.

The device is then removed from the tank and the position of the float noted.

While I have shown and described the preferred form of my invention, I realize that various minor changes may be resorted to, without departing from the spirit and scope of the invention as claimed, and therefore, I do not wish to limit myself to the exact details of construction shown, nor to the combination and arrangement of parts.

What I claim as new and desire to secure by Letters Patent is:

1. A liquid depth gauge comprising a rule having a scale on one face graduated in terms of liquid depth and a substantially straight edge, an operating lever pivoted intermediate its ends to said rule adjacent the upper end of the latter so that the ends of the lever are spaced from said straight edge, a flexible guide spaced from and extending parallel to the straight edge of the rule, means for securing one end of said guide to the lower end of the rule, a spring connecting the other end of said guide to the lower end of the lever, and a float mounted for sliding movement on said flexible member and adapted to normally frictionally engage the edge of said rule and, when the upper end of said lever is actuated, to be free to slide vertically along said member.

2. A liquid depth gauge comprising a rule having a scale on one face graduated in terms of liquid depth and a substantially straight edge, an operating lever pivoted to said rule adjacent the upper end of the latter so that one end of the lever is spaced from said straight edge, a flexible guide spaced from and extending parallel to the straight edge of the rule, means for securing one end of said guide to the lower end of the rule, means for connecting the other end of the guide to the lever, and a float mounted for slidable movement on said flexible member and adapted to normally frictionally engage the edge of said rule and, when the upper end of said lever is actuated, to be free to slide vertically along said member.

In testimony whereof, I have affixed my signature in the presence of two witnesses.

CECIL F. SIDERS.

Witnesses:
GAIL D. McCREIGHT,
OLIVER S. McCREIGHT.